United States Patent Office 2,850,478
Patented Sept. 2, 1958

2,850,478

MIXTURES COMPRISING METHACRYLONITRILE POLYMERS WITH ALKYL ACRYLATE POLYMERS

Harry W. Coover, Jr., and Willis C. Wooten, Jr., Kingsport, Tenn., assignors to Eastman Kodak Company, Rochester, N. Y., a corporation of New Jersey No Drawing. Application November 15, 1954
Serial No. 469,034

4 Claims. (Cl. 260—45.5)

This invention relates to resinous compositions comprising mixtures of methacrylonitrile polymers containing at least 80% by weight of methacrylonitrile with a polymer of an acrylic or methacrylic ester containing at least 80% by weight of the ester.

Polymethacrylonitrile and copolymers thereof containing a high percentage of methacrylonitrile have properties that make them useful in the formulation of shaped articles. However, these polymers have certain other properties which are undesirable in that they tend to color and decompose when they are formed into shaped articles using the usual techniques such as injection molding. This color formation can be decreased by lowering the processing temperatures through the incorporation of a plasticizer or by the copolymerization of methacrylonitrile with another monomer such as an acrylic ester. However, these modifications result in a lowering of the heat distortion temperature of the resulting material so that shaped articles prepared therefrom do not possess the desired stability to deformation. For example, copolymers of methacrylonitrile and methyl or ethyl acrylate, in order to be readily flowable at lower processing temperatures, require an acrylate content above about 30% at which proportions and above the shaped articles prepared therefrom have too low distortion temperatures for practical commercial applications. It would, therefore, be very advantageous to provide a molding composition which would retain the high heat distortion properties of polymethacrylonitrile and at the same time have a good flow rate under processing conditions and give shaped products free from color and decomposition effects. We have now found that such an advantageous composition can be prepared by physically mixing in certain proportions a methacrylonitrile polymer containing at least 80% by weight of methacrylonitrile with a polymer of an acrylic or methacrylic alkyl ester containing at least 80% by weight of the ester.

It is, accordingly, an object of the invention to provide new resinous compositions comprising certain mixtures of methacrylonitrile polymers with acrylic or methacrylic ester polymers. Another object is to provide resinous compositions suitable for shaping purposes which have relatively high flow rates at lower processing temperatures and which are capable of giving shaped objects which are low in color and having relatively high distortion temperatures. Another object is to provide methods for preparing the said resinous compositions. Other objects will become apparent hereinafter.

In accordance with our invention, we prepare resinous compositions comprising physical mixtures of from 80 to 98% of polymethacrylonitrile or a methacrylonitrile binary copolymer containing at least 80%, but preferably from 80 to 95%, by weight of methacrylonitrile and the remainder of a different monoethylenically unsaturated polymerizable compound, and from 20 to 2% by weight of a homopolymer of an acrylic ester represented by the general formula:

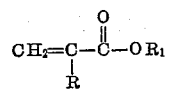

wherein R represents an atom of hydrogen or a methyl group and $R_1$ represents an alkyl group containing from 1 to 12 carbon atoms, or a binary copolymer of said ester containing at least 80% to 95% by weight of the said acrylic ester, and the remainder of a different monoethylenically unsaturated, polymerizable compound. The preferred compositions comprise from 80 to 98% by weight of polymethacrylonitrile and from 20 to 2% by weight of a polyalkyl acrylate or polyalkyl methacrylate, such preferred compositions having especially operable flow rates, and the shaped articles prepared therefrom being essentially devoid of color and decomposition products, and having desirably high heat distortion temperatures.

The above defined mixtures can be prepared by any of several methods. For example, the polymeric components can be dissolved in one or more common solvents such as N,N-dimethyl formamide, N,N-dimethyl acetamide, gamma-butyrolactone, etc. In this procedure the components can be mixed together before addition to the solvent or they can be dissolved separately in the solvent and their separate solutions then mixed together, the mixture in either case being precipitated into a nonsolvent therefor by known procedures. They can also be polymerized separately to aqueous emulsion form, the emulsions then mixed together and coagulated by means of a saturated salt solution, followed by filtering, washing and drying the coagulated mixed polymeric product. They can also be prepared by thoroughly mixing the polymeric components on hot rolls and the mixture obtained then being granulated. While the mixtures of the invention do not require a plasticizer, it is sometimes beneficial to incorporate small amounts of plasticizers such as normal butyl sulfone. By doing so, it always requires less of the plasticizer to produce a given processing temperature than is required for the methacrylonitrile polymer mixture containing no plasticizer. Also, small amounts of stabilizers such as hydroquinone bisglycidyl ether, epichlorohydrin or hypophosphorous acid can advantageously be added to the above mixtures.

The influence of various amounts of acrylic ester polymer in admixture with methacrylonitrile polymers on the rate of flow and heat distortion temperature of mixtures coming within the scope of the invention can be seen from the following table wherein various proportions of the respective polymers are represented by polyethylacrylate and polymethacrylonitrile. All of the Samples A–D contain 5 parts by weight normal butyl sulfone as a plasticizer and 3 parts by weight of hydroquinone bisglycidyl ether as a stabilizer. Sample E is the same as Sample A, except that 10 parts of butyl sulfone is employed. The flow rate of these samples was measured in a modified extrusion plastometer at 190° C. and 100 p. s. i. All the polymer mixtures represented by Samples B–D, when molded, gave specimens of buttons with about the same heat distortion temperatures.

TABLE

| Sample | Parts by weight | | | Flow rate, gm./min. | Heat distortion temperature, degrees centigrade |
| --- | --- | --- | --- | --- | --- |
| | Polymethacrylonitrile | Polyethyl acrylate | Butyl sulfone | | |
| A | 100 | 0 | 5 | 0.2 | 77 |
| B | 95 | 5 | 5 | 0.9 | 73 |
| C | 90 | 10 | 5 | 1.8 | 74 |
| D | 80 | 20 | 5 | 4.5 | 74 |
| E | 100 | 0 | 10 | 0.4 | 66 |

Thus, the presence of 5% of polyethylacrylate admixed with 95% of polymethacrylonitrile (Sample B) shows an increase in flow rate of 4.5 times as compared with the composition containing no polyethylacrylate (Sample A) with only a relatively small drop of 4° C. in the heat distortion temperature. As the proportion of polyethylacrylate is increased, the flow rate also increases until at 20% polyethylacrylate content the flow rate shows over 20 fold increase without further lowering of the heat distortion temperature which becomes constant at 74° C. Doubling of the butyl sulfone content from 5% to 10%, based on the weight of polymer, doubles the flow rate, but at the same time produces a drastic lowering of the heat distortion temperature to 66° C. (Compare Samples A and E.) Accordingly, a marked improvement in flow rate without serious reduction in the heat distortion temperature results by admixture of polyethylacrylate with polymethacrylonitrile in accordance with our invention.

Suitable binary copolymers of methacrylonitrile for practicing our invention include copolymers containing at least 80% by weight of methacrylonitrile and up to 20% by weight of a different unsaturated compound such as an acrylic or methacrylic acid alkyl ester wherein the alkyl group contains from 1 to 12 carbon atoms, e. g. methyl acrylate, ethyl acrylate, propyl acrylate, butyl acrylate, lauryl acrylate, etc. and corresponding methacrylic acid esters, a vinyl aromatic hydrocarbon compound such as styrene, a vinylnaphthalene, etc., α-methylstyrene, a vinyl halide such as vinyl chloride, vinyl fluoride, etc., or a vinylidene halide such as vinylidene chloride, vinylidene chloride-bromide, etc. Suitable binary copolymers of alkyl acrylates and alkyl methacrylates for practicing our invention include those copolymers containing at least 80% by weight of the alkyl acrylate or alkyl methacrylate and up to 20% by weight of a different unsaturated compound such as a vinyl aromatic hydrocarbon, a vinyl halide, a vinylidene halide, above defined, or methacrylonitrile.

The following examples will serve to illustrate further the new resinous compositions of our invention and the manner of their preparation.

Example 1

In a 3-necked flask equipped with a stirrer, a thermometer and a nitrogen inlet, there were placed 500 g. of freshly distilled ethyl acrylate, 3000 g. of distilled water, 10 g. of sodium lauryl sulfate, 2.5 g. of potassium persulfate and 2.5 g. of tertiary dodecyl mercaptan. The mixture was stirred under an atmosphere of nitrogen at 50° C. for 24 hours to form an emulsion of polyethyl acrylate. Part of the emulsion was broken by the addition thereto of a saturated aqueous sodium chloride solution. The resulting precipitated rubbery polymer was separated, washed with water, and dried at 40° C.

Example 2

A mixture of 1000 g. of methacrylonitrile, 3000 g. of water, 10 g. of sodium lauryl sulfate, 10 g. of potassium persulfate and 5 g. of tertiary dodecyl mercaptan was heated under nitrogen, with stirring, at 50° C. for 48 hours in a 3-necked flask equipped with a mechanical stirrer, a thermometer and a nitrogen inlet tube. Part of the emulsion obtained was broken with a saturated aqueous sodium chloride solution, the precipitated polymer was separated, washed with water and dried at 50° C. to yield polymethacrylonitrile in the form of a fine white powder.

Example 3

Using the same apparatus and polymerization method of Example 2, an aqueous mixture containing 9 g. of methacrylonitrile and 1 g. of α-methylstyrene was polymerized to give an emulsion of a copolymer consisting of approximately 90% by weight of methacrylonitrile and 10% by weight of α-methylstyrene.

In place of the α-methylstyrene in the above example, there can be substituted a like amount of styrene to give a copolymer of methacrylonitrile and styrene, or a like amount of ethyl acrylate to give a copolymer of methacrylonitrile and ethyl acrylate, or a like amount of methyl methacrylate to give a copolymer of methacrylonitrile and methyl methacrylate, or a like amount of vinylidene chloride to give a copolymer of methacrylonitrile and vinylidene chloride, etc.

Example 4

400 g. of the aqueous emulsion of polymethacrylonitrile prepared in Example 2 (equivalent to 100 g. of polymer) and 70 g. of the aqueous emulsion of polyethyl acrylate prepared in Example 1 (equivalent to 10 g. of polymer) were mixed thoroughly together and the mixed polymers isolated by breaking the emulsion with a saturated aqueous sodium chloride solution. The precipitated polymer obtained was an intimate mixture consisting of approximately 90% by weight of polymethacrylonitrile and 10% by weight of polyethyl acrylate. It was filtered, washed with water and dried at 50° C. to yield a fine white powder which was readily moldable into shaped objects at 200° C. without noticeable color formation.

Example 5

20 g. of polyethyl acrylate prepared and isolated according to Example 1, 180 g. of polymethacrylonitrile prepared and isolated according to Example 2, 20 g. of normal butyl sulfone and 3 g. of hydroquinone bisglycidyl ether were mixed on a hot mill roll or in a heated screw extruder to give an intimately mixed composition, wherein the proportions of polymers were 10% by weight of polyethyl acrylate and 90% by weight of polymethacrylonitrile. The mixture was readily moldable into shaped objects such as buttons at 200° C. without noticeable color formation.

In place of the polymethacrylonitrile in the above example, there can be substituted a like amount of any of the methacrylonitrile binary copolymers described in Example 3, to give mixtures containing, for example, 90% by weight of a 90:10 copolymer of methacrylonitrile/α-methylstyrene and 10% by weight of polyethyl acrylate, or 90% by weight of a 90:10 copolymer of methacrylonitrile/ethyl acrylate and 10% by weight of polyethyl acrylate, or 90% by weight of a 90:10 copolymer of methacrylonitrile/vinylidene chloride, etc.

The following examples illustrate that not all unsaturated nitriles give readily flowable, color-free, tough molded articles having relatively high distortion temperatures. For example, mixtures prepared with polyacrylonitrile are not at all the equivalents of those prepared according to our invention with polymethacrylonitrile. This will be apparent from the examples below where mixtures with polymethacrylonitrile are compared with mixtures made with polyacrylonitrile.

Example 6

(a) 40 g. of polymethacrylonitrile, 5 g. of poly-n-butyl acrylate and 3 g. of hydroquinone bisglycidyl ether were mixed on a hot roll. The mixture obtained was granulated and readily injection molded at 200° C. to produce tough, practically colorless bars.

(b) The same experiment was carried out as above (a), except that a like amount of polyacrylonitrile was used in place of the polymethacrylonitrile. The mixture that was obtained could not be injection molded although the temperature was gradually raised to the point where the mixture decomposed. Accordingly, this mixture does not have the good flow properties of the mixture prepared according to above (a).

Example 7

(a) 40 g. of polymethacrylonitrile, 5 g. of polyisobutyl methacrylate and 3 g. of hydroquinone bisglycidyl ether were mixed on a hot roll. The mixture obtained was granulated and readily injection molded at 200° C. to give hard, tough and practically colorless bars.

(b) Polyacrylonitrile in like amount was substituted for the polymethacrylonitrile in above (a). The mixture obtained could not be molded due to decomposition thereof before a temperature could be reached at which the mixture would mold.

Example 8

(a) 40 g. of polymethacrylonitrile, 10 g. of poly-n-lauryl methacrylate and 3 g. of hydroquinone bisglycidyl ether were mixed on a hot roll. The mixture obtained was granulated and injection molded at 200° C. to give hard, tough and practically colorless bars.

(b) Polyacrylonitrile in like amount was substituted for the polymethacrylonitrile in above (a). The mixture obtained could not be injection molded due to decomposition thereof before a temperature could be reached at which the mixture would mold.

Example 9

(a) 40 g. of polymethacrylonitrile, 10 g. of polyethyl acrylate and 3 g. of hydroquinone bisglycidyl ether were mixed on a hot roll. The mixture obtained was granulated and injection molded at 200° C. to produce tough, practically colorless bars.

(b) Polyacrylonitrile in like amount was substituted in place of the polymethacrylonitrile in above (a). The mixture obtained could not be injection molded due to decomposition thereof before a temperature could be reached at which the mixture would flow sufficiently well to mold.

By proceeding as set forth in the examples illustrating the invention, any other physical mixtures coming within the specified ranges of from 80 to 98% by weight of methacrylonitrile polymer containing at least 80% by weight of methacrylonitrile and from 20 to 2% by weight of an acrylic or methacrylic alkyl ester polymer containing at least 80% by weight of the polymeric ester can be prepared, for example, preferably mixtures containing 80%, 85%, 90%, 95%, 98%, etc. of polymethacrylonitrile, the remainder of the mixture in each case being a polyacrylate such as polyethyl acrylate, a polybutyl acrylate, etc. or a corresponding polymethacrylate. These mixtures, as well as those containing the copolymers coming within the invention, all have similarly good flow rates and the articles produced therefrom are characterized by absence of color and decomposition products, and show relatively high distortion temperatures.

Although the mixed compositions of the invention have been specifically described in connection with their use for molding of three dimensional objects and articles, these compositions are also adaptable to the preparation of sheet materials which may or may not contain, as desired, suitable fillers, plasticizers, dyes, stabilizers, and the like added materials. For sheet making purposes, the mixed compositions can be coated from their solutions in suitable organic solvents onto smooth surfaces of metal, glass, etc., or extruded from their hot melts. Such sheet materials are characterized by dimensional stability due to their relatively high heat distortion temperatures and are eminently suitable for use as photographic film supports.

What we claim is:

1. A resinous composition comprising a mixture of from 80 to 98% by weight of polymethacrylonitrile and from 20 to 2% by weight of a homopolymer of an alkyl acrylate wherein the said alkyl group contains from 1 to 12 carbon atoms.

2. A resinous composition comprising a mixture of from 80 to 98% by weight of polymethacrylonitrile and from 20 to 2% by weight of polyethyl acrylate.

3. A resinous composition comprising a mixture of from 80 to 98% by weight of polymethacrylonitrile and from 20 to 2% by weight of poly-n-butyl acrylate.

4. A resinous composition comprising a mixture of from 80 to 98% by weight of polymethacrylonitrile and from 20 to 2% by weight of polyisobutyl acrylate.

References Cited in the file of this patent

UNITED STATES PATENTS

| | | |
|---|---|---|
| 2,191,580 | Nowak et al. | Feb. 27, 1940 |
| 2,666,025 | Nozaki | Jan. 12, 1954 |
| 2,666,042 | Nozaki | Jan. 12, 1954 |